United States Patent [19]

Nishimoto et al.

[11] 4,169,605
[45] Oct. 2, 1979

[54] SHAFT SEALING MEANS FOR HIGH PRESSURE FLUID

[75] Inventors: Takashi Nishimoto; Seiichi Suzuki; Hiroyoshi Takamori, all of Toyama, Japan

[73] Assignee: Kabushiki Kaisha Fujikoshi, Toyama, Japan

[21] Appl. No.: 855,227

[22] Filed: Nov. 28, 1977

[30] Foreign Application Priority Data

Dec. 7, 1976 [JP] Japan ................ 51/163631[U]

[51] Int. Cl.² .............................................. F16J 15/32
[52] U.S. Cl. ................................................ 277/188 A
[58] Field of Search ........... 277/125, 233, 235, 188 R, 277/188 A

[56] References Cited

U.S. PATENT DOCUMENTS

| 3,477,731 | 11/1969 | Workman | 277/235 |
| 3,762,729 | 10/1973 | Hopp | 277/233 |

FOREIGN PATENT DOCUMENTS 106344  3/1967  United Kingdom ............ 277/125

Primary Examiner—Robert I. Smith
Attorney, Agent, or Firm—Spencer & Kaye

[57] ABSTRACT

A shaft sealing means for use in a hydraulic pump/motor having a rotary shaft rotating within its body, an oil seal fitted in the gap between the rotary shaft and the body for sealing therebetween and between the high and low pressure sides, and a spacer fixed in the gap. The shaft sealing means comprises anti-protrusion means fitted relatively tightly in the gap with its high pressure side surface in close contact with the low pressure side surface of the oil seal for preventing protrusion of the oil seal toward the low pressure side, and anti-friction means inserted in the gap between the anti-protrusion means and the spacer for providing a sliding motion between the anti-protrusion means and the spacer thereby reducing the generation of frictional forces therebetween. This construction eliminates the possibility of damaging the oil seal thereby preventing oil leakage and also resulting in an improved shaft sealing means for use in a high pressure and/or high speed hydraulic pump/motor having a long service life.

10 Claims, 5 Drawing Figures

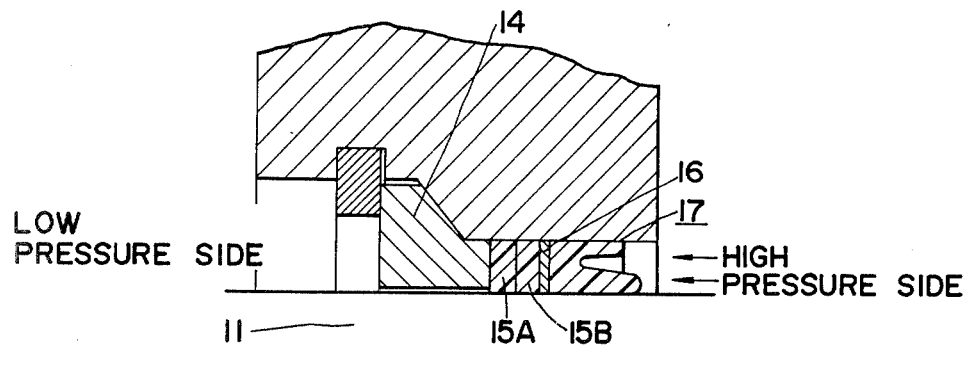
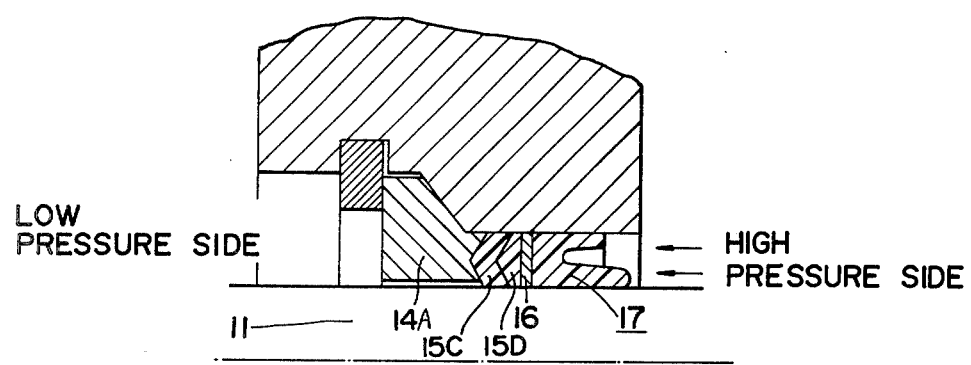
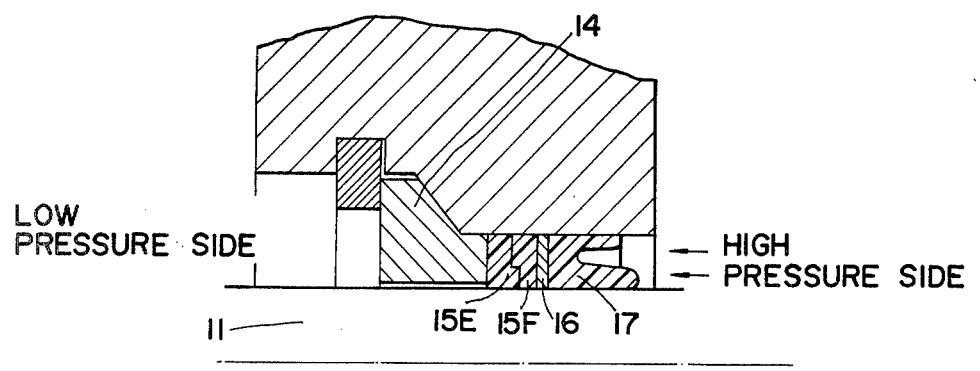

SHAFT SEALING MEANS FOR HIGH PRESSURE FLUID

BACKGROUND OF THE INVENTION

1. Field of the Invention

The invention relates to improvements in a shaft sealing means and, more particularly, to a shaft sealing means for use with high pressure fluid, to directly seal such high pressure fluid acting between a rotary shaft and a body.

2. Description of the Prior Art

In a hydraulic pump/motor having a rotary shaft and an oil seal for sealing the rotary shaft, it is important to prevent fluid under pressure from escaping over the oil seal. This has been accomplished by providing drain means through which the pressurized fluid can be drawn to the outside so that the oil seal is not exposed to direct high pressures.

Where this arrangement is difficult to implement for practical reasons, another arrangement has been employed as shown in FIG. 1 wherein between the rotary shaft 1 and the body 2 there are provided a U-packing or oil seal 7, a spacer 4 retaining the oil seal 7 in position, a snap ring 3 for retaining the spacer, and a shim 8 which provides a proper clearance between the oil seal 7 and the spacer 4. While this arrangement is satisfactory for use with a relatively low pressure fluid, it has been found that its usefulness is limited in applications where a high pressure fluid is employed. That is, the oil seal 7 has its lip 9 in sealing cooperation with the rotary shaft 1 to provide an adequate seal between the rotary shaft 1 and the body 2 with a low fluid pressure on the order of 5 kg/cm$^2$. As the pressure at the high pressure side of the seal is increased, however, the oil seal 7 is pressed toward the spacer 4 causing it to protrude into the gaps between the spacer 4 and the rotary shaft 1 and between the spacer 4 and the body 2. With the fluid pressure further increased, the oil seal 7 having its lip 9 in close contact with the rotary shaft 1 slightly rotates with rotation of the rotary shaft 1 to generate strong frictional forces between the oil seal 7 and the spacer 4. This produces oil seal contact surface stripping, a deformed or damaged oil seal and oil seal seizure under generated heat thereby causing leakage of the pressurized fluid.

BRIEF SUMMARY OF THE INVENTION

It is, therefore, a primary object of the present invention to provide an improved shaft sealing means for use with high pressure fluid which will be an effective seal when the high pressure fluid is applied to the rotary shaft of a hydraulic pump/motor.

Another object of the present invention is to provide an improved shaft sealing means which will be effective in preventing the oil seal from protruding toward the spacer when a high fluid pressure is applied to the oil seal and also in preventing the occurrence of oil seal contact surface stripping, a deformed or damaged oil seal and oil seal seizure under generated heat. The generated heat is caused by slight rotation of the oil seal, which has its lip in close contact with the rotary shaft with rotation of the rotary shaft, and results in oil leakage.

A further object of the present invention is to provide an improved shaft sealing means for use in a high pressure and/or high speed hydraulic pump/motor which has a long service life.

These and other objects are accomplished in accordance with the present invention by providing, between the oil seal and the spacer, anti-protrusion means comprised of a metallic ring relatively tightly fitted between the rotary shaft and the body in close contact with the low pressure side of the oil seal for preventing protrusion of the oil seal toward the low pressure side, and anti-friction means comprised of a ring or shim made of a self-lubricating material interposed between the low pressure side surface of the anti-protrusion means and the spacer in sliding contact therewith.

Other objects and advantages of the present invention will become more apparent from the detailed description of the preferred embodiments which follow.

BRIEF DESCRIPTION OF THE DRAWINGS

In the detailed description of the preferred embodiments presented below, reference is made to the accompanying drawings wherein corresponding parts are identified by like reference numerals and in which:

FIG. 3 is a fragmentary sectional view showing an alternative embodiment according to the present invention;

FIG. 4 is a view similar to FIG. 3 but showing a modification wherein two rings have their cooperating surfaces formed in a V-shaped cross-sectional configuration; and FIG. 5 is a view similar to FIG. 3 but showing another modification wherein the two rings have their cooperating surfaces formed in stepped cross-sectional configuration.

DESCRIPTION OF THE PREFERRED EMBODIMENTS

Figure 1:
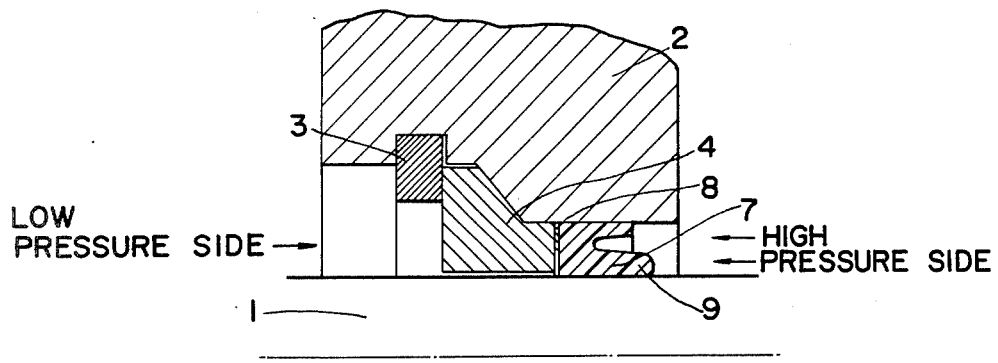
FIG. 1 is a fragmentary sectional view of a prior art shaft sealing means.
Figure 2:
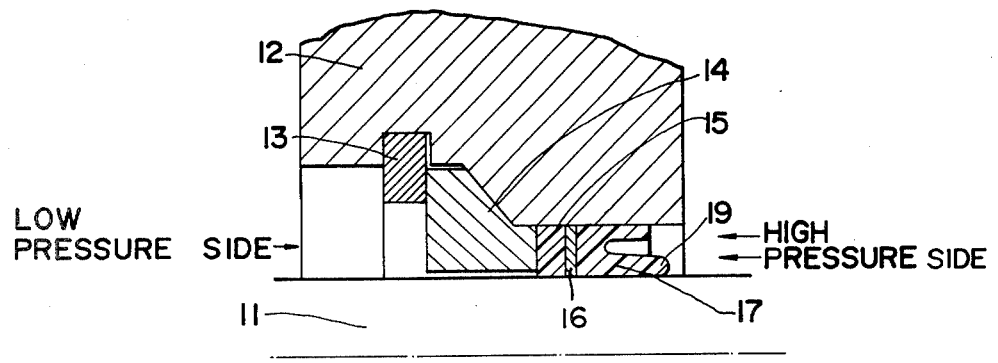
FIG. 2 is a fragmentary sectional view showing one embodiment of a shaft sealing means made in accordance with the present invention.

Referring now to FIG. 2 illustrating in section one embodiment of a shaft sealing means made in accordance with the present invention, there is provided between a rotary shaft 11 and a body 12 an oil seal 17 in sealing engagement therewith. It will be appreciated that the term "oil seal" is meant to include any prior art means referred generally to as "oil seal" and made for example of a resilient material for sealing the gap between the rotary shaft 11 and the body 12 such as V-packings, U-packings, and other packings having a quadrilateral cross-section.

Also provided in the gap between the rotary shaft 11 and the body 12 are a spacer 14 retaining the oil seal 17 in place and a snap ring 13 fixing the spacer 14 to the body 12. It will also be appreciated that the term "spacer" is meant to include any prior art means for retaining the oil seal 17 in place. The oil seal 17 is exposed directly to a high fluid pressure, for example, on the order of 140 kg/cm$^2$.

In the gap between the oil seal 17 and the spacer 14, there are provided a metallic ring 16 and a ring or shim 15 made of a self-lubricating material. The metallic ring 16 is relatively tightly fitted in the gap between the rotary shaft 11 and the body 12 and is made of a resilient material resiliently deformable axially of the ring 16 such that it can be maintained in close contact with the low pressure side surface of the oil seal 17 in accordance with the pressure exerting on the oil seal 17 when the pressure is increased to a higher level. The metallic ring 16 constitutes anti-protrusion means for preventing the oil seal from being caused to protrude the low pressure side. The metallic ring 16 is not provided to support the entire high fluid pressure exerted on the oil seal 17, but to prevent stripping of the contact surface of the oil seal 17 and deformation of the lip 19 of the oil seal 17 which would result from protrusion of the oil seal 17.

The ring or shim 15 constitutes anti-friction means which is interposed between the low pressure side surface of the metallic ring 16 and the spacer 14 in sliding contact relation such that the metallic ring 16 can slidingly rotate on the high pressure side surface of the ring or shim 15 when rotated slightly by rotation of the rotary shaft 11. The ring or shim 15 may be arranged to slidingly rotate on the high pressure side surface of the spacer. For this purpose, the ring or shim 15 is made of a self-lubricating material such as polytetrafluoroethylene resin, nylon resin, phenol resin or other synthetic resin having a low friction factor low abrasion, and high heat-resistance.

In operation, when the body 12, the oil seal 17, and the rotary shaft 11 are subjected to a high fluid pressure, for example, on the order of 140 kg/cm$^2$, the metal ring 16 functions as a resistance to protrusion of the oil seal 17. When the lip 19 of the oil seal 17 is pressed against the rotary shaft 11 and rotated slightly by rotation of the rotary shaft 11, the metal ring 16 rotates on the surface of the ring 15 with the metallic ring 16 held in close contact with the oil seal 17. Thus, the shaft sealing means according to the present invention is free from the faults found in the prior art such as contact abrasion on the surfaces of the oil seal 17 and the spacer 14 resulting in oil seal contact surface stripping, a deformed or damaged oil seal and oil seal seizure. Thus, it is effective in preventing oil leakage. When the ring 15 is not fixed to the spacer 14, the ring 15 slidingly rotates also on the high pressure side surface of the spacer 14 so as to reduce the rotation transmitted from the ring 16 to the ring 15. This effectively eliminates the problems resulting from heat generation and abrasion when the rotary shaft 11 rotates at high speed.

FIG. 3 illustrates an alternative embodiment according to the present invention which is substantially similar to the first described embodiment except that the anti-friction means is comprised of two separate rings 15A and 15B. In this embodiment, when the oil seal 17 is slightly rotated by rotation of the rotary shaft 11, the rotation transmitted to the outer ring 15A can be reduced by the sliding motion between the inner and outer rings 15A and 15B and the reduced rotation is transmitted to the spacer 14 so as to reduce the influence due to heat generation and abrasion resulting from the sliding rotation.

FIG. 4 illustrates a modification of the FIG. 3 embodiment wherein the anti-friction means is comprised of two separate rings 15C and 15D having their cooperating surfaces formed in a V-shaped cross-sectional configuration. The high pressure side surface of the inner ring 15D is flat to permit close contact with the ring 16 and the low pressure side surface of the outer ring 15C has a V-shaped cross-section which is in sliding contact with the spacer 14A. Spacer 14A has same cross-sectional configuration as the low pressure side surface configuration of the outer ring 15C. In this arrangement, when a high fluid pressure is applied, the surfaces of the outer and inner rings 15C and 15D which contact the rotary shaft 11 are pressed against the rotary shaft 11 to provide a good seal for high pressure fluid. This results in a shaft sealing means for higher pressure applications having a long service life.

FIG. 5 illustrates another modification of the FIG. 3 embodiment wherein the anti-friction means is comprised of two separate rings 15E and 15F having their cooperating surfaces formed in a stepped cross-sectional configuration. This arrangement can provide an effect similar to that of the FIG. 4 arrangement without specially machining the spacer 14, resulting in a low cost seal.

In the described embodiments the metallic ring 16 is in sliding contact with the ring or shim and therefore have a different function from the currently used mechanical seals which rotate together with the rotary shaft for sealing.

It is to be understood that the oil seal 17 and the metallic ring 16 may be fixed together before being installed in the hydraulic pump/motor to eliminate the possibility of an error in assembling the hydraulic pump/motor. Similarly, the spacer 14 or 14A and the ring 15 may be fixed together before being installed in the pump/motor where the pump/motor is of the type in which the rotary shaft 11 does not rotate at high speed.

While the present invention has been particularly shown and described with reference to preferred embodiments thereof, it will be understood by those skilled in the art that the foregoing and other changes in form and details may be made therein without departing from the spirit and scope of the present invention.

What is claimed is:

1. A shaft sealing means for use in a hydraulic pump/motor including a body having high and low pressure sides, a rotary shaft rotatable within said body, an oil seal fitted in the gap between said rotary shaft and said body for sealing therebetween and between said high and low pressure sides, and a spacer fixed in said gap, said means comprising:
   anti-protrusion means fitted relatively tightly in said gap with its high pressure side surface in close contact with the low pressure side surface of said oil seal to prevent protrusion of said oil seal toward said low pressure side; and
   anti-friction means inserted in the gap between said anti-protrusion means and said spacer to provide a sliding motion between said spacer and said anti-protrusion means whereby said anti-protrusion means and said oil seal may be rotated slightly around said rotary shaft as said shaft rotates thereby reducing the generation of frictional forces between said oil seal and said spacer.

2. A shaft sealing means as set forth in claim 1, wherein said anti-friction means is comprised of two separate rings in sliding contact with each other.

3. A shaft sealing means as set forth in claim 2, wherein said two separate rings have their cooperating surfaces formed in a V-shaped cross-sectional configuration.

4. A shaft sealing means as set forth in claim 2, wherein said two separate rings have their cooperating surfaces formed in a stepped cross-sectional configuration.

5. A shaft sealing means as set forth in claim 1, wherein said anti-friction means is made of a synthetic resin having a low frictional factor, low abrasion and high heat resistance.

6. A shaft sealing means as set forth in claim 5 wherein said anti-friction means is made of a synthetic resin selected from the group consisting of polytetrafluoroethylene resin, nylon resin and phenol resin.

7. A shaft sealing means as set forth in claim 1, wherein said anti-protrusion means is made of a material resiliently deformable in its axial direction.

8. A shaft sealing means as set forth in claim 1, wherein said anti-protrusion means is fixed to the oil seal.

9. A shaft sealing means as set forth in claim 1, wherein said anti-protrusion means is fixed to the oil seal and said anti-friction means is fixed to said spacer.

10. A shaft sealing means as set forth in claim 1, wherein said anti-friction means is fixed to said spacer.

* * * * *